May 18, 1965     D. E. POLLOCK     3,184,011
LOAD SENSITIVE SHOCK ABSORBER
Filed July 3, 1963
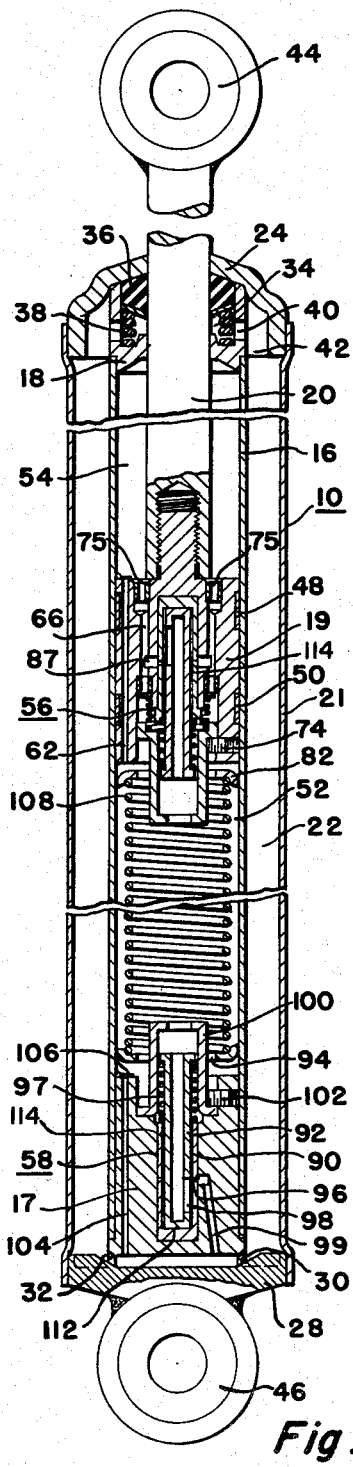
Fig. 2
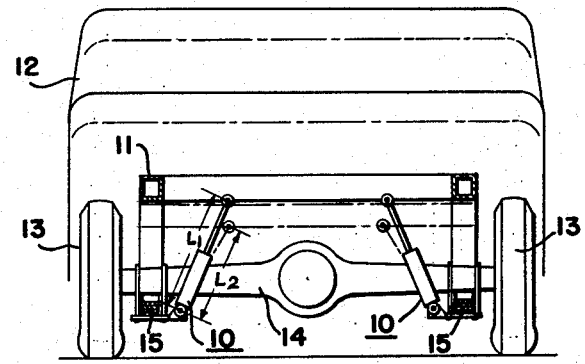
Fig. 1
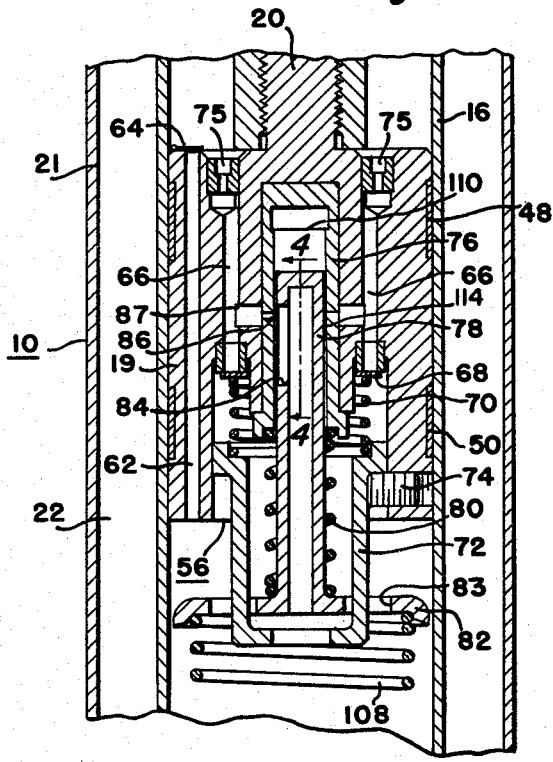
Fig. 3
Fig. 4
INVENTOR.
Donald E. Pollock
BY J.C. Evans
His Attorney

# United States Patent Office 3,184,011
Patented May 18, 1965

3,184,011
LOAD SENSITIVE SHOCK ABSORBER
Donald E. Pollock, Royal Oak, Mich., assignor to General Motors Corporation, Detroit, Mich., a corporation of Delaware
Filed July 3, 1963, Ser. No. 292,683
9 Claims. (Cl. 188—88)

This invention relates to hydraulic shock absorbers and more particularly to direct-acting type shock absorbers.

One problem in direct-acting hydraulic shock absorbers is that the damping characteristics thereof are in part dependent on the weight of the sprung mass or chassis frame of the vehicle attached at one end of the shock absorber for movement relative to an unsprung mass or the wheel and axle structure of the vehicle attached to the opposite end of the shock absorber. Since the weight of the sprung mass will vary to a greater or lesser degree depending upon the load in the vehicle, it has been found that under many loading conditions the effective damping action of the shock absorber is considerably less than is desired for comfortable riding action.

An object of the present invention, therefore, is to improve a direct-acting hydraulic shock absorber by including means therein for maintaining an optimum damping action irrespective of weight variations in the sprung mass.

A further object of the present invention is to improve direct-acting hydraulic shock absorbers by the provision of means therein responsive to changes in the static or mean length between the support fittings thereof as caused by changes in weight of the sprung mass for optimizing the damping action of the shock absorber in accordance with the weight of the sprung mass.

A further object of the present invention is to improve direct-acting hydraulic shock absorbers by the provision of first variable orifice means in the piston element thereof and second variable orifice means in the base valve means thereof with the first and second variable orifice means being operatively associated with means responsive to changes in the effective length of the shock absorber as produced by changes in the weight of the sprung mass for conditioning the first and second variable orifice means to optimize the damping effect of the shock absorber through a wide range of sprung masses associated therewith.

A further object of the present invention is to improve direct-acting hydraulic shock absorbers having such variable orifice means for controlling the damping effect of the shock absorber including the provision of means for maintaining the orifice means in a predetermined controlling position during normal oscillations of the sprung mass once the shock absorber has attained a predetermined static or mean length.

Further objects and advantages of the present invention will be apparent from the following description, reference being had to the accompanying drawings wherein a preferred embodiment of the present invention is clearly shown.

In the drawings:

FIGURE 1 is a diagrammatic view of a fluid suspension system for a motor vehicle including the present invention;

FIGURE 2 is a vertical cross-sectional view of the shock absorber of the present invention;

FIGURE 3 is an enlarged fragmentary sectional view of the piston element in FIGURE 2; and FIGURE 4 is a view in vertical section taken along the line 4—4 of FIGURE 3.

As illustrated in FIGURE 1 of the drawing, shock absorbers 10 including the present invention are shown in a suspension system for supporting a sprung mass representatively illustrated as a chassis 11 and body 12 of a motor vehicle supported for relative movement relative to an unsprung mass including road engaging wheels 13 and an axle housing 14 by means of springs 15. In FIGURES 2–4 the shock absorber 10 is illustrated as including an elongated cylinder element 16 closed at one end thereof by a base closure element 17 and at the opposite end thereof by a rod guide member 18. The cylinder 16 receives a piston 19 carried on the end of a rod 20 that extends from the end of the shock absorber through the rod guide member 18.

A cylindrical tube 21 surrounds the elongated cylinder element 16 to form a space 22 therebetween serving as a reservoir for hydraulic fluid. The upper end of the tube 21 has an end cap 24 secured thereto against which an upper end of the rod guide member 18 abuts. The opposite end of the tube 21 has an end cap 28 on which the base closure element 17 of the shock absorber cylinder 16 abuts. A plurality of ribs 30 are provided on the inner surface of the cap 28 to position the member 17 in spaced relationship to the end cap 28 to provide passageways 32 therebetween in communication with space 22.

The rod guide element 18 has a chamber 34 therein receiving a resilient rod seal member 36 held under compression by means of a compression spring 38 against the outer periphery of rod 20 to prevent fluid leakage outwardly of the end of the shock absorber through which the rod 20 extends. The sealed chamber 34 is connected with the reservoir space 22 through an opening 40 in the rod guide element 18 and one or more passageways 42 between the end cap 24 and the rod guide element 18 to relieve against any buildup of pressure in chamber 34 during operation of the shock absorber.

A fitting 44 on the upper end of the rod 20 is provided for attachment to a sprung mass such as the chassis 11 while the end cap 28 carries a suitable fitting 46 for attachment to an unsprung mass or running gear such as the axle housing 14 in FIGURE 1.

The piston 19, as best shown in FIGURE 3, is representatively illustrated as including spaced annular sealing elements 48, 50 on the outer periphery thereof that sealingly engage the inner surface of the shock absorber cylinder 16 for separating the cylinder 16 into a compression chamber 52 and a rebound chamber 54 filled with a suitable hydraulic fluid.

The piston 19 is reciprocated within the cylinder 16 by the rod 20 upon relative movement between the sprung and unsprung masses and includes piston valve means 56 for restricting fluid flow thereacross during the reciprocal movement thereof. Piston valve means 56 cooperates with base valve means 58 in the base closure element 17 to provide a desired damping of the movement between the sprung and unsprung masses.

The piston valve means 56, more particularly, includes a passageway 62 directed axially through the piston 19 to communicate the compression chamber 52 with the rebound chamber 54 under the control of a valve element 64 supported on the upper surface of the piston 16 to be biased thereagainst for blocking fluid flow from chamber 54 to chamber 52. Radially inwardly of passageway 62 the piston 19 includes a plurality of axially extending passageways 66 extending therethrough that are closed at their lower ends by means of a disc valve 68 held on seats formed around each of the passageways 66 by a coil spring 70 disposed between the disc valve 68 and a hollow retainer element 72 supported within a recess in the lower end of piston 19 and held against movement outwardly thereof by means of a set screw 74 threaded in one side of the lower end of the piston 19 so that one end thereof engages an upper shoulder on the retainer element 72. The upper end of each of the passageways 66 has a fixed orifice element 75 supported therein for metering fluid flow therethrough.

Supported centrally within the piston 19 at a point radially inwardly of passageways 66 is a tubular element 76 having one end thereof closed and the opposite end thereof open to receive a second tubular element 78 in telescoping relationship therewith for sliding movement relative thereto. The first tubular element 76 is resiliently held in place in the piston 19 by means of a coil spring 80 disposed between the open end of the tubular element 76 and a cup-shaped end portion 82 on the tubular element 78. The end portion 82 includes openings 83 therein for receiving interconnected depending arms on the retainer element 72 which serve to limit movement of the tubular elements outwardly of the piston 19. The tubular element 78 includes a generally triangular-shaped opening 84 in one side thereof communicating with a semicircular groove 86 in the side wall of the first tubular element 76 that in turn communicates through a passageway 87 in piston 19 with one of the axially directed passageways 66 through the piston 19. The opening 84 and groove 86 serve as a variable orifice upon relative movement between the tubular elements 76, 78 for restricting fluid flow between the compression and rebound chambers 52, 54.

The base valve means 58 in the base closure element 17 at the lower end of the cylinder 16 includes a tubular element 90, similar to element 76 in the piston 19, supported centrally within element 17. The tubular element 90 telescopically receives a second tubular element 92 which has a cup-shaped head portion 94 serving as a retainer for a compression spring 97 for resiliently biasing the tubular element 90 within the closure element 17. As in the case of the telescoping tubular elements 76, 78 in the piston 19, the tubular element 90 in the closure element 17 has a semicircular opening 96 in the side wall thereof communicating with a generally triangularly shaped opening 98 in the side wall of the telescoping tubular element 92 with the openings 96, 98 serving as a variable orifice for restricting fluid flow between the compression chamber 52 and reservoir space 22 via a passageway 99 in closure element 17 and openings 32 into reservoir space 22. A valve assembly retainer element 100 held in place on the upper surface of the closure element 17 by means of a set screw 102 threaded therein includes interconnected upwardly directed arms extending through the head portion 94 to limit movement of tubular element 92 outwardly of element 17.

The closure element 17 further includes an axially directed passageway 104 directed therethrough in communication with openings 32 at one end and blocked at the other end by means of a check valve 106 spring biased into engagement with the upper surface of the closure element 17.

In the normal operation of the above-described shock absorber, movement of the piston 19 downwardly toward the base valve assembly 58 during the compression stroke causes hydraulic fluid to be displaced from the compressor chamber 52 into the rebound chamber 54 through passageway 62 and valve 64. Displacement of hydraulic fluid in the chamber 54, because of the entry of the rod 20 therein, however, eventually causes a pressure differential across piston 19 sufficient to move disc valve 68 to thereby allow fluid flow from chamber 54, through passageways 66 into chamber 52. The displaced fluid from the rebound chamber 54 will pass through the openings 96, 98 in tubular elements 90, 92 of the base valve assembly 58 into the fluid reservoir space 22 and the restricted openings 98, 96 in the base valve assembly 58 produce damping of the compression stroke of the shock absorber.

On the rebound stroke or upward movement of piston 19, hydraulic fluid will be displaced from the chamber 54 into the chamber 52 primarily through the restricted openings 84, 86 in tubular elements 78, 76 for damping the upward movement of piston 19. The volume of fluid thus displaced through the piston 19 will be insufficient to fill the total volume of the chamber 52 and accordingly make-up of hydraulic fluid will be received from the reservoir space 22 through passageway 104 and valve 106 with the flow of hydraulic fluid being able to open the valve 106 against substantially no resistance to allow relatively free flow of the hydraulic fluid therethrough.

In the normal shock absorber of the direct-acting hydraulic fluid type, the degree of fluid flow restriction across the reciprocal piston unit and the base valve assembly is not varied in accordance with changes in the weight of the sprung mass acting on the shock absorber. The damping factor $\xi$ of the shock absorber or the ability of the shock absorber to take care of oscillations in the suspension system under road-shock conditions is equal to $C/2\sqrt{KM}$ wherein C equals the damping coefficient of the shock absorber, K equals the vehicle spring rate which remains essentially constant through all phases of the shock absorber operation and M equals the sprung mass supported on the shock absorber structure. Thus, it can be seen that changes in the sprung mass M will vary the effectiveness of the shock absorber as reflected by the damping factor $\xi$ thereof unless some means are provided to vary the damping coefficient C.

In accordance with certain of the concepts of the present invention, it is recognized that the static or mean length of the shock absorber between the supporting fittings 44, 46 thereon reflects changes in the sprung mass. For example, in the suspension system of FIGURE 1, as the weight of the sprung mass 11, 12 increases a predetermined amount, it will cause the vehicle springs 15 to compress to thereby reduce the distance between the support fittings from $L_1$ to $L_2$. In accordance with certain of the principles of the present invention, this change in the static mean length of the shock absorber increases the spring force of a spring 108 disposed between the end portion 82 of tubular element 78 and the head portion 94 of tubular element 92 located in the piston 19 and base closure element 17, respectively. This produces an unbalanced force on the elements 78, 92 causing them to move axially of the tubular elements 76, 90 a predetermined amount under the control of springs 70 and 97 until the spring forces are equalized on elements 78, 92. The triangular openings 84, 98 in the tubular elements 78, 92 thereby are arranged to produce a greater or lesser restriction of flow across the piston 19 and base closure element 17 whereby the damping coefficient C is varied to maintain the damping factor $\xi$ at a substantially optimum value irrespective of changes in the weight of the sprung mass.

Once a predetermined static or mean length occurs and the spring forces on elements 78, 92 are equalized to thereby position them to obtain an optimized damping factor, it is desirable to maintain the elements in their equilibrium position during oscillations of the suspension system produced under normal road shock conditions. Accordingly, other features of the invention include trapping fluid in spaces 110, 112 formed respectively by the telescoping tubular elements 76, 78 in the piston 19 and the telescoping tubular elements 90, 92 in the base valve assembly 58. Fluid in the spaces 110, 112 can only escape or flow therein through the restricted passageways 114 formed at the interface between the telescoping tubular elements upon relative movement therebetween. The tubular elements thereby serve as a highly effective dashpot-like damping arrangement which allows only minute movement of the telescoping tubular elements during normal oscillations of the shock absorber such as those that occur under normal road shock conditions. Therefore, once the effective or static length of the shock absorbers has been established the control spring portions and dashpot spaces 110, 112 of the device will hold the telescoping tubular valving elements in a position for maintaining an optimum shock absorber damping factor.

While the embodiment of the present invention as herein disclosed constitutes a preferred form, it is to be understood that other forms might be adapted.

What is claimed is as follows:

1. In a direct-acting shock absorber, the combination of, means including cylinder means and reciprocable piston means slidably mounted therein forming first and second fluid chambers, said piston means including first valve means controlling fluid flow thereacross in opposite directions of flow on opposite reciprocal movement of said piston means in said cylinder means, fluid reservoir means receiving fluid from said fluid chambers and from which fluid is returned to said fluid chambers, second valve means providing for restricted flow of fluid from one of said fluid chambers to said reservoir means and substantially unrestricted return flow thereto, said first and second valve means each including passageway means and a movable element including a variable opening therein to control the cross-sectional area of said passageway means for controlling the restriction of fluid flow across said piston means and between said one of fluid chambers and said reservoir means, means for resiliently biasing said movable elements in a direction to increase the cross-sectional area of said passageway means for reducing the restriction of fluid flow across said piston means and between said one of said fluid chambers and said reservoir means, and means for resiliently biasing said movable elements in an opposite direction to increase the fluid restriction across said piston means and between said one of said fluid chambers and said reservoir means, said last-mentioned means being responsive to changes in the weight of a sprung mass associated with the shock absorber for varying the fluid restriction across said piston means and between said one of said fluid chambers and said reservoir means to optimize the damping factor of the shock absorber by varying the damping coefficient thereof in accordance with changes in the weight of the sprung mass associated with the shock absorber.

2. In a direct-acting shock absorber, means including cylinder means and a reciprocal piston means slidably mounted therein for forming first and second fluid chambers, said piston means including first valve means controlling fluid flow thereacross in opposite directions of flow on opposite reciprocal movement of said piston means in said cylinder means, fluid reservoir means receiving fluid from said fluid chambers and from which fluid is returned to said fluid chambers, second valve means providing for restricted flow of fluid from one of said fluid chambers to said reservoir and a substantially unrestricted return flow thereto, said first valve means including variable orifice means for restricting fluid flow across said piston means for damping movement of said piston means in a first predetermined direction, said second valve means including variable orifice means for restricting fluid flow between one of said fluid chambers and said reservoir means for damping movement of said piston means in a second predetermined direction, load sensitive means responsive to changes in the weight of a sprung mass associated with the shock absorber for conditioning said first and second variable orifice means to optimize the damping factor of the shock absorber by varying the damping coefficient of the shock absorber in accordance with changes in the weight of the sprung mass, and means for stabilizing said first and second variable orifice means to maintain the optimum damping factor of the shock absorber for a given weight of the sprung mass during oscillations of the spring mass produced by normal road shock conditions.

3. In a direct-acting shock absorber, the combination of, means including cylinder means and a reciprocable piston means slidably mounted within said cylinder means for forming first and second fluid chambers, said first piston means including first valve means controlling fluid flow thereacross in opposite directions of flow on opposite reciprocal movement thereof within said cylinder means, said first valve means including means for restricting fluid flow to damp movement of said piston means in a first predetermined direction, actuator means directed through one of said fluid chambers for reciprocating said piston within said cylinder means, fluid reservoir means receiving fluid displaced from said first and second fluid chambers by said actuator means and from which fluid is returned to said fluid chambers, second valve means providing for restricted flow of fluid from one of said fluid chambers to said reservoir and substantially unrestricted return flow thereto to damp movement of said piston means in a second predetermined direction, said actuator means and cylinder means having a variable static length corresponding to the weight of a sprung mass associated with the shock absorber, means responsive to the static length of said cylinder means and actuator means for varying the restriction of fluid flow by said first and second valve means to optimize the damping factor of the shock absorber by varying the damping coefficient thereof in accordance with changes in the weight of the sprung mass as reflected in the changes in the static length of said cylinder means and actuator means, and means for stabilizing said first and second valve means to maintain the desired fluid flow restriction for a particular static length during relative movement between said cylinder means and said piston means produced by oscillations of the sprung mass produced by normal road shock conditions.

4. In a direct-acting shock absorber, the combination of, means including cylinder means and a reciprocable piston means slidably mounted therein for forming first and second fluid chambers, said piston means including first valve means controlling fluid flow thereacross in opposite directions of flow on opposite reciprocal movement of said piston means in said cylinder means, actuator means within one of said fluid chambers for reciprocating said piston means, fluid reservoir means receiving fluid displaced from said fluid chambers by said actuator means and from which fluid is returned to said fluid chambers, second valve means providing for restricted flow of fluid from one of said fluid chambers to said reservoir and substantially unrestricted return flow thereto, each of said first and second valve means including variable orifice means restricting fluid flow between said first and second fluid chambers and said reservoir means for damping the reciprocal movement of said piston means, said cylinder means and actuator means having a variable static length corresponding to the weight of a sprung mass associated with the shock absorber, means for varying the fluid flow restriction of said variable orifice means to optimize the damping factor of the shock absorber by varying the damping coefficient thereof in accordance with changes in the weight of the sprung mass as reflected in changes in the static length of said cylinder means and actuator means, and means for stabilizing said variable orifice means to maintain a particular fluid flow restriction for a particular static length to maintain the desired damping factor during oscillations of the sprung mass produced by normal road shock conditions.

5. In a direct-acting shock absorber, the combination of, means including cylinder means and a reciprocable piston means slidably mounted within said cylinder means for forming first and second fluid chambers, said piston means including first valve means controlling fluid flow thereacross in opposite directions of flow on opposite reciprocal movement of said piston means within said cylinder means, actuator means within one of said fluid chambers for reciprocating said piston means, fluid reservoir means receiving fluid displaced from said fluid chambers by said actuator means and from which fluid is returned to said fluid chambers, second valve means providing for restricted flow of fluid from one of said fluid chambers to said reservoir and substantially unrestricted return flow thereto, each of said first and second valve means including a movable element having a first opening therein and a fixed element having a second opening therein, means for resiliently biasing said movable elements relative to said fixed elements for reducing fluid flow restriction across said first and second openings therein, said cylinder means and actuator means having a variable static length corresponding to the weight of a sprung mass associated with the shock absorber that varies in accordance with changes in the weight of the sprung mass, means for resiliently biasing said movable elements in an opposite direction for increasing fluid flow restriction between said first and second openings responding to changes in the static length of said cylinder means and actuator means to optimize the damping factor of the shock absorber by varying the damping coefficient thereof in accordance with changes in the weight of the sprung mass, and means including said movable and fixed elements of said first and second valve means for stabilizing said movable elements in a predetermined location corresponding to a particular static length during oscillations of the sprung mass produced by normal road shock conditions to thereby maintain a shock absorber damping coefficient corresponding to the weight of the suspended mass that will produce an optimum shock absorber damping factor.

6. In a direct-acting shock absorber, the combination of, means including cylinder means and reciprocable piston means slidably mounted therein for forming first and second fluid chambers, said piston means including first valve means controlling fluid flow thereacross in opposite directions of flow on opposite direct reciprocal movement of said piston means in said cylinder means, actuator means directed through one of said fluid chambers for reciprocating said piston means, fluid reservoir means receiving fluid displaced from said one of said fluid chambers by said actuator means and from which fluid is returned to said fluid chambers, a base valve assembly for restricting flow of fluid from another of said fluid chambers to said reservoir and substantially unrestricted return flow thereto, first variable orifice means in said piston means for restricting fluid flow thereacross for damping movement of said piston means in a first predetermined direction, second variable orifice means in said base valve means for restricting fluid flow thereacross for damping movement of said piston means in a second predetermined direction, said first and second variable orifice means each including telescoping elements having openings therein for providing a variable restricted opening across said piston means and across said base valve means for varying the damping of said piston means, means for resiliently biasing said telescoping elements in a direction to reduce the fluid flow resistance across said piston means and across said base valve means, and means for resiliently biasing said telescoping elements in an opposite direction to increase the fluid flow resistance across said piston means and said base valve means in accordance with changes in the weight of a sprung mass associated with a shock absorber for maintaining an optimum shock absorber damping factor.

7. In a direct-acting shock absorber, the combination of, means including cylinder means and reciprocable piston means slidably mounted therein for forming first and second fluid chambers, said piston means including first valve means controlling fluid flow thereacross in opposite directions of flow on opposite direct reciprocal movement of said piston means in said cylinder means, actuator means directed through one of said fluid chambers for reciprocating said piston means, fluid reservoir means receiving fluid displaced from said one of said fluid chambers by said actuator means and from which fluid is returned to said fluid chambers, a base valve assembly for restricting flow of fluid from another of said fluid chambers to said reservoir and substantially unrestricted return flow thereto, first variable orifice means in said piston means for restricting fluid flow thereacross for damping movement of said piston means in a first predetermined direction, second variable orifice means in said base valve means for restricting fluid flow thereacross for damping movement of said piston means in a second predetermined direction, said first and second variable orifice means each including telescoping elements having openings therein for providing a variable restricted opening across said piston means and across said base valve means for varying the damping of said piston means, means for resiliently biasing said telescoping elements in a direction to reduce the fluid flow resistance across said piston means and across said base valve means, and means for resiliently biasing said telescoping elements in an opposite direction to increase the fluid flow resistance across said piston means and said base valve means in accordance with changes in the weight of a sprung mass associated with a shock absorber for maintaining an optimum shock absorber damping factor, and means for stabilizing said telescoping elements to maintain the optimum damping factor of the shock absorber for a given weight of the sprung mass during oscillations of the sprung mass produced by normal road shock conditions.

8. In a direct-acting shock absorber, the combination of, means including cylinder means and reciprocable piston means slidably mounted therein for forming first and second fluid chambers, said piston means including first valve means controlling fluid flow thereacross in opposite directions of flow on opposite direct reciprocal movement of said piston means in said cylinder means, actuator means directed through one of said fluid chambers for reciprocating said piston means, fluid reservoir means receiving fluid displaced from said one of said fluid chambers by said actuator means and from which fluid is returned to said fluid chambers, a base valve assembly for restricting flow of fluid from another of said fluid chambers to said reservoir and substantially unrestricted return flow thereto, first variable orifice means in said piston means for restricting fluid flow thereacross for damping movement of said piston means in a first predetermined direction, second variable orifice means in said base valve means for restricting fluid flow thereacross for damping movement of said piston means in a second predetermined direction, said first and second variable orifice means each including telescoping elements having openings therein for providing a variable restricted opening across said piston means and across said base valve means for varying the damping of said piston means, said cylinder means and actuator means having a variable static length corresponding to the weight of a sprung mass associated with the shock absorber, means for resiliently biasing said telescoping elements in a direction to reduce the fluid flow resistance across said piston means and across said base valve means, and means responsive to change in the static length of said cylinder means and actuator means for resiliently biasing said telescoping elements in an opposite direction to increase the fluid flow resistance across said piston means and said base valve means to optimize the damping factor of the shock absorber by varying the damping coefficient thereof in accordance with changes in the weight of the sprung mass as reflected in the changes in the abovementioned static length.

9. In a direct-acting shock absorber, the combination of means including cylinder means and reciprocable piston means slidably mounted therein for forming first and second fluid chambers, said piston means including first valve means controlling fluid flow thereacross in opposite directions of flow on opposite direct reciprocal movement of said piston means in said cylinder means, actuator means directed through one of said fluid chambers for reciprocating said piston means, fluid reservoir means receiving fluid displaced from said one of said fluid chambers by said actuator means and from which fluid is returned to said fluid chambers, a base valve assembly for restricting flow of fluid from another of said fluid chambers to said reservoir and substantially unrestricted return flow thereto, first variable orifice means in said piston means for restricting fluid flow thereacross for damping movement of said piston means in a first predetermined direction, second variable orifice means in said base valve means for restricting fluid flow thereacross for damping movement of said piston means in a second predetermined direction, said first and second variable orifice means each including telescoping elements having openings therein for providing a variable restricted opening across said piston means and across siad base valve means for varying the damping of said piston means, said cylinder means and actuator means having a variable static length corresponding to the weight of a sprung mass associated with the shock absorber, means for resiliently biasing said telescoping elements in a direction to reduce the fluid flow resistance across said piston means and across said base valve means, means responsive to change in the static length of said cylinder means and actuator means for resiliently biasing said telescoping elements in an opposite direction to increase the fluid flow resistance across said piston means and said base valve means to optimize the damping factor of the shock absorber by varying the damping coefficient thereof in accordance with changes in the weight of the sprung mass as reflected in the changes in the abovementioned static length, and means for stabilizing said telescoping elements to maintain a particular fluid flow restriction for a particular static length to thereby hold the desired damping factor during oscillations of the sprung mass produced by normal road shock conditions.

References Cited by the Examiner

UNITED STATES PATENTS

| | | | |
|---|---|---|---|
| 2,031,000 | 2/36 | Mercier | 267—64 |
| 2,089,657 | 8/37 | Mercier | 267—64 X |
| 2,565,617 | 8/51 | Mercier et al. | |
| 2,934,332 | 4/60 | Mercier. | |
| 3,022,061 | 2/62 | Takgi | 267—8 |

FOREIGN PATENTS 834,809  5/60  Great Britain.

EUGENE G. BOTZ, *Primary Examiner.*